(12) United States Patent
Paulk et al.

(10) Patent No.: US 10,552,391 B2
(45) Date of Patent: Feb. 4, 2020

(54) SYSTEMS AND METHODS FOR REAL TIME DATA MANAGEMENT IN A COLLABORATIVE ENVIRONMENT

(75) Inventors: Martin D. Paulk, Houston, TX (US); David Johnson, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 806 days.

(21) Appl. No.: 12/404,181

(22) Filed: Mar. 13, 2009

(65) Prior Publication Data

US 2009/0254569 A1 Oct. 8, 2009
US 2011/0106856 A2 May 5, 2011

(51) Int. Cl.
| | |
|---|---|
| *G06F 7/00* | (2006.01) |
| *G06F 16/22* | (2019.01) |
| *G06Q 10/06* | (2012.01) |
| *G06Q 10/10* | (2012.01) |
| *G06F 15/16* | (2006.01) |

(52) U.S. Cl.
CPC ............. *G06F 16/22* (2019.01); *G06Q 10/06* (2013.01); *G06Q 10/10* (2013.01); *G06F 15/16* (2013.01)

(58) Field of Classification Search
CPC ..................................................... G06F 15/16
USPC ........................................................ 707/769
See application file for complete search history.

(56) References Cited

U.S. PATENT DOCUMENTS

| | | |
|---|---|---|
| 5,710,918 A | 1/1998 | Lagarde et al. |
| 5,821,925 A | 10/1998 | Carey et al. |
| 5,884,298 A * | 3/1999 | Smith, II ............. G11B 27/002 |
| 5,930,786 A | 7/1999 | Carino, Jr. et al. |
| 6,219,057 B1 | 4/2001 | Carey et al. |
| 6,266,619 B1 | 7/2001 | Thomas et al. |
| 6,289,382 B1 * | 9/2001 | Bowman-Amuah ......... G06F 13/387 709/226 |
| 6,304,864 B1 | 10/2001 | Liddy et al. |
| 6,356,844 B2 | 3/2002 | Thomas et al. |
| 6,434,529 B1 * | 8/2002 | Walker ............... G10L 15/1822 704/275 |
| 6,438,594 B1 * | 8/2002 | Bowman-Amuah ......... G06F 9/4488 709/225 |
| 6,505,210 B1 * | 1/2003 | Frey ........................ G06F 9/465 |
| 6,529,909 B1 * | 3/2003 | Bowman-Amuah ......... G06F 16/258 |

(Continued)

FOREIGN PATENT DOCUMENTS

| | | |
|---|---|---|
| EP | 0747841 A1 | 11/1996 |
| GB | 2382431 A | 5/2003 |

(Continued)

OTHER PUBLICATIONS

U.S. Appl. No. 13/529,084, Non-Final Office Action, dated Nov. 26, 2012, 10 pages.

(Continued)

*Primary Examiner* — Eliyah S. Harper
(74) *Attorney, Agent, or Firm* — Kilpatrick Townsend Stockton LLP (57) ABSTRACT

Systems and methods for real time data management in a collaborative environment. In one embodiment, the systems and methods dynamically link stakeholders, through a collaborative environment, to current and updated data. The systems and methods also cross-reference data objects between stakeholders for calling data objects by a common name, and determine a preferred method for each operation related to processing data for a data object.

20 Claims, 8 Drawing Sheets

(56) References Cited

U.S. PATENT DOCUMENTS

| | | | |
|---|---|---|---|
| 6,539,396 B1* | 3/2003 | Bowman-Amuah | 707/769 |
| 6,611,847 B1* | 8/2003 | Fontana | G06F 17/30607 |
| 6,678,882 B1 | 1/2004 | Hurley et al. | |
| 6,792,431 B2 | 9/2004 | Tamboli et al. | |
| 6,826,483 B1 | 11/2004 | Anderson et al. | |
| 6,853,921 B2 | 2/2005 | Thomas et al. | |
| 6,988,270 B2 | 1/2006 | Banavar et al. | |
| 7,043,521 B2 | 5/2006 | Eitel | |
| 7,079,952 B2 | 7/2006 | Thomas et al. | |
| 7,146,356 B2 | 12/2006 | Choi et al. | |
| 7,243,093 B2 | 7/2007 | Cragun et al. | |
| 7,287,048 B2 | 10/2007 | Bourbonnais et al. | |
| 7,478,024 B2 | 1/2009 | Gurpinar et al. | |
| 7,519,503 B2 | 4/2009 | Midttun et al. | |
| 10,061,932 B1* | 8/2018 | Combs | G06F 21/608 |
| 2002/0052932 A1 | 5/2002 | Curtis et al. | |
| 2002/0087383 A1* | 7/2002 | Cogger | G06F 11/0709 709/223 |
| 2002/0167935 A1* | 11/2002 | Nabkel | H04L 41/00 370/352 |
| 2002/0169888 A1* | 11/2002 | Nabkel | H04L 41/22 709/238 |
| 2003/0031164 A1* | 2/2003 | Nabkel | H04L 41/22 370/352 |
| 2003/0033179 A1 | 2/2003 | Katz et al. | |
| 2003/0050807 A1 | 3/2003 | Hoffman et al. | |
| 2003/0061130 A1* | 3/2003 | Hoffman | G06Q 10/06 705/30 |
| 2003/0177481 A1 | 9/2003 | Amaru et al. | |
| 2003/0188863 A1 | 10/2003 | Gilbert et al. | |
| 2003/0197733 A1 | 10/2003 | Beauchamp et al. | |
| 2003/0229900 A1 | 12/2003 | Reisman | |
| 2004/0044648 A1* | 3/2004 | Anfindsen | G06Q 10/06 |
| 2004/0186762 A1 | 9/2004 | Beaven et al. | |
| 2004/0230571 A1 | 11/2004 | Robertson | |
| 2005/0071384 A1 | 3/2005 | Cotner et al. | |
| 2005/0160059 A1* | 7/2005 | Garrity | G06F 16/955 |
| 2005/0234889 A1 | 10/2005 | Fox et al. | |
| 2006/0053196 A1 | 3/2006 | Spataro et al. | |
| 2006/0122993 A1 | 6/2006 | Dettinger et al. | |
| 2006/0123020 A1* | 6/2006 | Bybee | G06F 16/164 |
| 2006/0167868 A1 | 7/2006 | Zhang et al. | |
| 2006/0195416 A1 | 8/2006 | Ewen et al. | |
| 2006/0265385 A1 | 11/2006 | Agrawal et al. | |
| 2007/0073674 A1 | 3/2007 | McVeigh et al. | |
| 2007/0088754 A1* | 4/2007 | Brannon | G06F 17/3051 |
| 2007/0094601 A1 | 4/2007 | Greenberg et al. | |
| 2007/0162308 A1* | 7/2007 | Peters | G06F 19/328 705/2 |
| 2007/0169049 A1* | 7/2007 | Gingell | G06F 8/61 717/151 |
| 2007/0180408 A1 | 8/2007 | Rusu et al. | |
| 2007/0276851 A1 | 11/2007 | Friedlander et al. | |
| 2008/0046474 A1* | 2/2008 | Sismanis | G06F 17/30306 |
| 2008/0052358 A1 | 2/2008 | Beaven et al. | |
| 2008/0065592 A1 | 3/2008 | Doyle | |
| 2008/0072301 A1 | 3/2008 | Chia et al. | |
| 2008/0082569 A1* | 4/2008 | Mansour et al. | 707/102 |
| 2008/0127205 A1 | 5/2008 | Barros | |
| 2008/0177756 A1 | 7/2008 | Kosche et al. | |
| 2008/0201728 A1 | 8/2008 | Midttun et al. | |
| 2008/0255892 A1 | 10/2008 | Orangi et al. | |
| 2009/0077089 A1* | 3/2009 | Safo | G06F 16/38 |
| 2009/0125362 A1 | 5/2009 | Reid et al. | |
| 2009/0240516 A1* | 9/2009 | Palestrant | G06Q 10/10 705/346 |
| 2009/0254569 A1 | 10/2009 | Paulk et al. | |
| 2010/0005111 A1 | 1/2010 | Bal et al. | |
| 2013/0226932 A1 | 8/2013 | Paulk et al. | |

FOREIGN PATENT DOCUMENTS

| | | |
|---|---|---|
| WO | 9964959 A1 | 12/1999 |
| WO | 0127901 A1 | 4/2001 |
| WO | 0139086 A2 | 5/2001 |
| WO | 2006036127 A1 | 4/2006 |
| WO | 2006123040 A2 | 11/2006 |
| WO | 2007084611 | 7/2007 |
| WO | 2008011309 A1 | 1/2008 |
| WO | 2008/066872 A2 | 6/2008 |
| WO | 2008/068114 A1 | 6/2008 |

OTHER PUBLICATIONS

Australian Patent Application No. 2013200561, First Examiner Report, dated May 8, 2015, 5 pages.

Australian Patent Application No. 2013200561, Second Examination Report, dated Jul. 29, 2015, 3 pages.

Canadian Patent Application No. 2,754,747, Office Action, dated Nov. 28, 2016, 5 pages.

Canadian Patent Application No. 2,719,937, Examination Report, dated Jun. 1, 2015, 5 pages.

European Patent Application No. 10751171.9, Office Action, dated Mar. 31, 2017, 9 pages.

European Patent Application No. 10751171.9, Supplementary European Search Report, dated Jun. 13, 2014, 6 pages.

European Patent Application No. 14200409.2, European Search Report, dated May 8, 2015, 6 pages.

Mexican Patent Application No. MX/A/2010/010785, Office Action, dated Dec. 10, 2013, 4 pages.

Mexican Patent Application No. MX/A/2011/009556, Office Action (Final Decision), dated Jul. 6, 2015, 4 pages.

Mexican Patent Application No. MX/A/2014/008226, Office Action, dated Oct. 8, 2015, 1 page.

The International Search Report and the Written Opinion of the International Searching Authority, PCT/US10/25279, dated Apr. 8, 2010, 14 pages.

Boris Cetinich, Patent Examination Report No. 1, Australian Patent Application No. 201022952, dated Oct. 29, 2014, 4 pages, Australian Government IP Australia, Australia.

John Brass, Response to Examiner's Report / Withdrawal of Postponement of Acceptance, Australian Patent Application No. 2010222952, dated Nov. 13, 2014, 18 pages, Soruson & Ferguson, Sydney Australia.

U.S. Appl. No. 13/851,218, Non Final Office Action, dated Jun. 12, 2017, 11 pages.

European Patent Application No. 14200409.2, Office Action, dated Jun. 27, 2017, 9 pages.

Ravi Madray, Carolina Coll, Gordon Veitch; Chokri Chiboub; Machiel Butter; Samy Azouzi; Sami Bahri, Brahim Yaich; Tamer Saada; Integrated Field Modelling of the Miskar Field; Europec/ EAGE Conference and Exhibition, Rome, Italy, Jun. 9-12 2008; 1 page. [Abstract Only].

Article 34 Response; PCT/US2010/025279; Systems and Methods for Real Time Data Management in a Collaborative Environment; Oct. 13, 2010; pp. 1-13.

Waring, B.,Theuveny, B., Davies, D., Guedroudj, H., Danquigny, J., Brink, J., Shyeh, J., Gibbons, K., Toro, M., Diez, Duenas, M., Jakeman, S., and Aksland, T. Guidance on the Future of Real Time Production Optimisation in E&P. SPE Forum on RTPO. Nov. 6, 2007. 9 pages.

WITSML, Wellsite Information Transfer Standard Markup Language. [Internet] [retrieved on Aug. 27, 2009]. Retrieved from the Internet <URL: http://www.witsml.org/> 1 page.

The E&P Catalog. Datasheet. Flare Solutions. [Internet] [retrieved on Mar. 27, 2009]. Retrieved from the Internet <URL: http://www.flare-solutions.com/databases/infrastructure/FlareWebSite.nsf/current2004/epintro.html> 2 pages.

OpenSpirit. [Internet] [retrieved on Aug. 27, 2009]. Retrieved from the Internet <URL: http://openspirit.com/> 1 page.

POSC E&P Cataloguing Reference Standards. Datasheet. Petrotechnical Open Software Corporation [Internet] [retrieved on Mar. 27, 2009]. Retrieved from the Internet <URL: http://posc.org/technical/epicat/epicat.shtml> 5 pages.

(56) References Cited

OTHER PUBLICATIONS

PetrisWINDS Enterprise. Datasheet. Petris. [Internet] [retrieved on Mar. 27, 2009]. Retrieved from the Internet <URL: http://petris.com/Products_&_Services/Data_Management/petriswindsenterprise.asp> 2 pages.

PRODML, WITSML for Production. [Internet] [retrieved on Aug. 27, 2009]. Retrieved from the Internet <URL: http://www.witsml.org/> 1 page.

Howell, A. Obtaining Value From Oil & Gas Model Based Asset Management. Aspen Technology. Presented at the Gas Processors Association May 19, 2004. 19 pages.

Extract, transform, load. Wikipedia. [Internet] [retrieved on Mar. 3, 2009]. Retrieved from the Internet <URL: http://en.wikipedia.org/wiki/Extract,_transform,_load> 8 pages.

Ewing, R. E., Qin, G., and Zhao, W. High Performance Computing in Petroleum Applications. International Journal of Numerical Analysis and Modeling, Institute for Scientific Computing and Information, vol. 1, No. 1, 2004. 16 pages.

Tobais S., Thompson, D., Ahmed, U. Integrated Workflow Methodologies for Asset Teams. SPE Asia Pacific Conference on Integrated Modelling for Asset Management. Kuala Lumpur, Malaysia, Mar. 23-24, 1998. 4 pages.

PCT International Search Report & Written Opinion, PCT/US09/39480. dated May 15, 2009. 9 pages.

Francisco Javier Uhtoff Orive, Nullity Petition, Mexican Patent Application No. MX/a/2011/009555, Jul. 13, 2015, 58 pages, Administrative trial before the Federal Court of Fiscal and Administrative Justice, Mexico.

Mexican Patent Office, Office Action, Mexican Patent Application No. MX/a/2014/008226, dated Sep. 23, 2015, 1 page, Mexican Patent Office, Mexico.

Wu Guangping, Decision on Rejection, Patent Application No. 201080011896.3, dated Jan. 13, 2014, 9 pages, The State Intellectual Property Office of China, Beijing China.

Mexican Patent Office, Office Action, Mexican Patent Application No. MX/a/2010/010785, dated Dec. 10, 2013, 3 pages, Mexican Patent Office, Mexico.

Mexican Patent Office, Office Action, Mexican Patent Application No. MX/a/2011/009555, dated Jun. 27, 2013, 1 page, Mexican Patent Office, Mexico.

Mexican Patent Office, Office Action, Mexican Patent Application No. MX/a/2011/009555, dated Dec. 20, 2013, 4 pages, Mexican Patent Office, Mexico.

Ana Viets, Communication pursuant to Article 94(3)EPC, EP Application No. 09727609.1, Aug. 8, 2014, 6 pages, European Patent Office, Munich Germany.

International Preliminary Report on Patentability; PCT/US10/25279; dated Nov. 14, 2011; 4 pages.

International Preliminary Report on Patentability; PCT/US09/39480; dated Jan. 24, 2011; 9 pages.

Belix M. Ortiz; Office Action; U.S. Appl. No. 12/529,084; dated Nov. 26, 2012; 10 pages; United States Patent and Trademark Office; Alexandria, Virginia, US.

\* cited by examiner

SYSTEMS AND METHODS FOR REAL TIME DATA MANAGEMENT IN A COLLABORATIVE ENVIRONMENT

CROSS-REFERENCE TO RELATED APPLICATIONS

This application and U.S. patent application Ser. No. 12/418,367, which is incorporated herein by reference, are commonly assigned to Landmark Graphics Corporation.

STATEMENT REGARDING FEDERALLY SPONSORED RESEARCH

Not applicable.

FIELD OF THE INVENTION

The present invention generally relates to systems and methods for managing data, in real time, through a collaborative environment.

BACKGROUND OF THE INVENTION

Understanding and operating an oil and gas production asset as a single holistic system has been frustrated by significant impediments. For any asset, there are typically multiple applications, multiple data sets, multiple taxonomies and multiple users, also referred to herein as stakeholders, some or all of which may be sharing common data across the asset. Interoperability among these programs, persons, and structures as a single system, while desired, has been frustrated by the lack of an underlying framework for handling the necessary transformations, translations, and definitions required between and among the various system components.

Attempts to provide this understanding and operation have previously focused on providing data replication, where each stakeholder group develops or receives its own version of the logical network and data model that includes all of its requirements. In these attempts, the act of transforming the data model by correlating changes between the data model representations has not been done or has been done crudely. Although some level of interoperability has been achieved by point to point integration, it is largely limited to supporting single workflows. Moreover, changes to the data model representations cannot be effectively controlled when each stakeholder can decide whether such changes should be applied (accepted) and communicated to the other stakeholders.

Other impediments to real time data management include, for example, the use of different calls or names for the same data object and different methods for the same operation. Each data object and each operation may represent a separate data model representation. Consequently, each stakeholder's ability to effectively access updates to a data object and uniformly apply a preferred method to a particular operation are significantly impaired. A stakeholder, for example, may refer to the same data object by a different name thus, impairing the ability to communicate changes to the data object between different stakeholders. Each stakeholder may also utilize a different method for a particular operation when a preferred method is desired to maintain uniform operation results. Moreover, a stakeholder is often required to log onto a network to access a client server before downloading the desired data model representations or any changes made thereto. This sequence is typically required each time access to the data model is desired.

There is therefore, a need for systems and methods to provide uninterrupted interoperability among the various data sets, applications, taxonomies and stakeholders sharing data across a production asset. In other words, there is a need for dynamic linking between the stakeholders and the data model representations that allows the stakeholders to maintain access to each database and receive data model updates in real time. In addition, there is a need for a uniform system that calls objects within an object class by a common name and determines a preferred method for each operation within a collaborative environment.

SUMMARY OF THE INVENTION

The present invention therefore, meets the above needs and overcomes one or more deficiencies in the prior art by providing systems and methods for cross-referencing data objects between stakeholders in order to call data objects by a common name and determining a preferred method for each operation related to processing data for a data object.

In one embodiment the present invention includes a computer implemented method for managing data in a collaborative environment, which comprises: i) creating a system name on a data-integration platform to identify an object class; ii) selecting an object from the object class; iii) linking the object and the system name on the data-integration platform using a computer processor; iv) identifying a plurality of unique names in the collaborative environment used by a respective plurality of stakeholders to identify the object; v) linking each unique name for the object and the system name on the data-integration platform: vi) selecting another object from the object class: vii) linking the another object and the system name on the data-integration platform: viii) identifying a plurality of unique names in the collaborative environment used by a respective plurality of stakeholders to identify the another object: and ix) linking each unique name for the another object and the system name on the data-integration platform.

In another embodiment, the present invention includes a non-transitory program carrier device carrying computer executable instructions for managing data in a collaborative environment. The instructions are executable to implement: i) creating a system name on a data-integration platform to identify an object class; ii) selecting an object from the object class; iii) linking the object and the system name on the data-integration platform; iv) identifying a plurality of unique names in the collaborative environment used by a respective plurality of stakeholders to identify the object; v) linking each unique name for the object and the system name on the data-integration platform; vi) selecting another object from the object class; vii) linking the another object and the system name on the data-integration platform: viii) identifying a plurality of unique names in the collaborative environment used by a respective plurality of stakeholders to identify the another object: and ix) linking each unique name for the another object and the system name on the data-integration platform.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. DecisionSpace®, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 1:
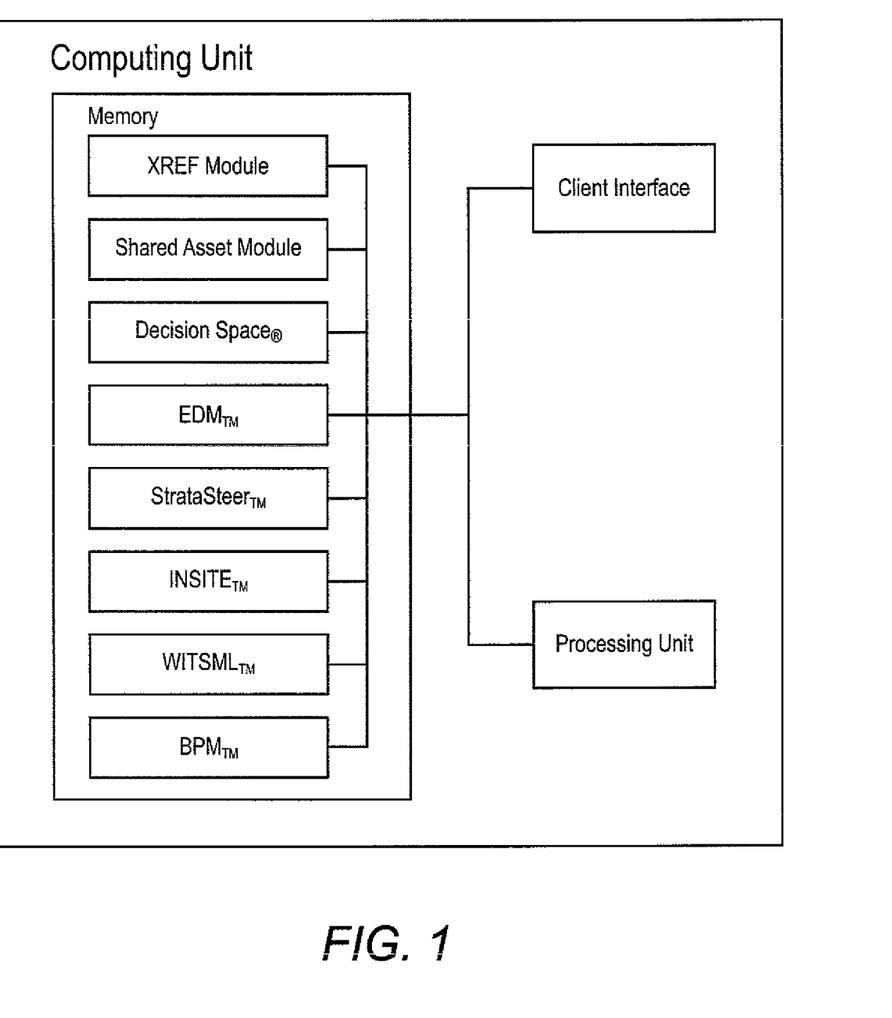
FIG. 1 is a block diagram illustrating one embodiment of a system for implementing the present invention.

Referring now to FIG. 1, a block diagram of one embodiment of a system for implementing the present invention on a computer is illustrated. The system includes a computing unit, sometimes referred to as a computing system, which contains memory, application programs, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 2-5. The memory therefore, includes a XREF Module, which enables the method illustrated and described in reference to FIGS. 3A and 3B. The memory also includes a Shared Asset Module, which enables the method illustrated and described in reference to FIG. 4. The Shared Asset Module includes a shared asset, also known as a system model, which is illustrated and described in reference to FIG. 2. The Shared Asset Model may also be used to enable the methods described in the '542 Application. The systems and methods of the present invention therefore, may be based on a system model that correlates meta-data-model representations of a production asset with the various asset-logic model representations (or taxonomies), in real time, to provide a collaborative, consistent, and relevant representation of the asset to the different stakeholders. The system model may perform the correlations between different meta-data model representations using the various asset-logic model representations for common data items and attributes shared across the system thus, addressing the many key activities relating to the asset that may have different meta-model representations representing their pertinent data requirements. In this manner, effective interoperability may be achieved. The XREF Module and Shared Asset Module also interact with DecisionSpace®, EDM™, StrataSteer, INSITE™, WITSML™ and BPM™ as further described in reference to FIG. 2.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, non-volatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above therefore, store and/or carry computer readable instructions, data structures, program modules and other data for the computing unit.

A stakeholder may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit trough the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

Figure 2:
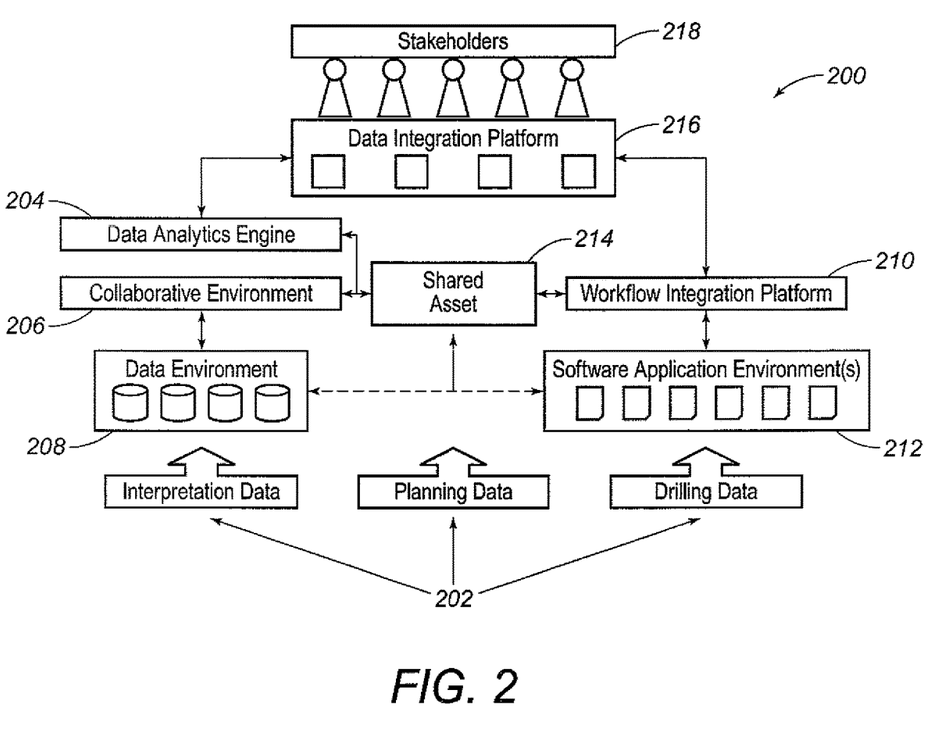
FIG. 2 is a block diagram illustrating one embodiment of a system architecture for implementing the present invention.

Referring now to FIG. 2, a block diagram of one embodiment of a system architecture 200 for implementing the present invention is illustrated. The shared asset 214 is illustrated within the wider system architecture 200 for collaboration among multiple stakeholders 218. Additional system components typically associated with a shared asset may include, for example, different types of data 202 (e.g. interpretation data, planning data and drilling data), data analytics engine 204, data-integration platform 216, data environment 208, workflow integration platform 210, software application environment(s) 212 and collaborative environment 206. The various components of the system architecture 200 enable specific inter-related functions and therefore, must interact with each other seamlessly in order to avoid discontinuities and/or errors. Other components of the system architecture 200 may include interfaces to and from an Enterprise Resource Planning System (e.g. SAP) or a computerized Maintenance Management System, or a computerized Work Management System controlling work in the physical asset and necessary status of equipment and system isolations.

The data analytics engine 204 allows data to be manipulated to produce numerous reports and analysis using simple to complex proprietary and industry standard algorithms. It typically supports data filtering and cleaning as well as appropriate visualization technologies to present data in meaningful, relevant and insightful ways into the viewing or collaborative environment 206 for use by the stakeholders 218.

The collaborative environment 206 typically represents a web-based (intranet or internet) access and viewing environment that can be used by a diverse range of potential geographically located stakeholders 218, which will provide secure access and bandwidths appropriate to the range of data and software applications included in the system architecture 200. The use of portals will typically allow diverse stakeholders 218 to have relevant custom views of only the data they require. The collaborative environment 206 therefore, cooperates with the workflow integration platform 210, the shared asset 214 and the data-integration platform 216 to present data to the stakeholders, as needed, in real time based on the operations conducted in the data analytics engine 204. Thus, cooperation among the foregoing described components for the system architecture 200 enable a data environment capable of changing in real time and/or an applications environment capable of selecting and using preferred methods in real time.

The data environment 208 typically interfaces with some regulatory or distributed control system incorporating data to and from instruments, meters, and control devices, such as actuators, valves and the like, across the physical asset. Considering the typical functions of each component, the data environment 208 typically includes multiple types of data 202, each designed to best suit particular types of data. For example, a relational database for interpretation data, a data historian for high frequency planning data and a data warehouse for drilling data such as well tables and production allocation tables. The data will exist in one or more data languages, such as, for example, OPC, ODBC, HTML, WITSML, and PRODML, which are well known in the art and conform to respective corresponding data standards.

The workflow integration and orchestration platform 210 spans the various IT operating environments, connects to the numerous software applications, maps to the respective data tags and items used by the software applications and interfaces with some viewing or shared collaborative environments to interface and interact with numerous stakeholders 218 involved across the workflows. The workflows are numerous but might include frequent and infrequent activities such as, for example, well test validation, production allocation, production surveillance, production optimization and others more particularly described in U.S. patent application Ser. No. 12/266,766, which is incorporated herein by reference.

The software application environment(s) 212 includes different IT operating environments such as Windows and Linux, appropriate to the range of applications used across the asset. The software application environment(s) 212 may also include well known, proprietary applications for providing diverse, complex, and relatively simple functionality. These applications, for example, may include petro-technical and geoscience applications common to the industry as well as more common software applications commonly used such as MS Office. These applications may also be used for, but not limited to, reservoir and well simulation, modeling of hydraulic networks and facilities systems, material balance, nodal analysis, production allocation, production surveillance, hydrocarbon accounting, regulatory reporting, and economics. These applications may be proprietary or customized and will invariably incorporate and use a multitude of algorithms, units, and annotations. These applications will also manipulate and transform existing data and generate further data in ways unique to the applications.

The shared asset 214 provides interoperability across the various diverse applications and datasets within the overall system architecture 200. In other words, the shared asset 214 manages the numerous interfaces and interactions between the data items and their correct and consistent usage within the various logic schemes that are representative of the system architecture 200. It does so in a dynamic operating environment where all or many components may be used simultaneously and/or continuously by the stakeholders 218, each with specific and varying access and authority rights. The shared asset 214 therefore, may enable the method illustrated and described in reference to FIG. 4 and the methods described in the '542 Application.

The data-integration platform 216 typically provides data connectors appropriate to each data language and database. This component allows the stakeholders 218 to map to particular data sets such as asset equipment tags or unique well identifiers, thus enabling data flow throughout the system architecture 200. The data-integration platform 216 therefore, may enable the method illustrated and described in reference to FIGS. 3A and 3B.

DecisionSpace® for Production may be used to provide the system architecture 200, component integration and set of functionality illustrated in FIG. 2. The XREF Module provides the data-integration platform 216. WITSML™ provides the collaborative environment 206 for dynamically linking data organization and visualization within the overall system architecture 200. DecisionSpace®, EDM™, StrataSteer™ and INSITE™ provide the technical applications for the software application environment(s) 212. The data environment 208 may include numerous databases that correspond with applications in the software application environment(s) 212. BPM™ provides the workflow integration platform 210, which enables orchestration or technical workflows that utilize technical applications and data from the related data 202 and software application environment(s) 212. DecisionSpace®, StrataSteer™ and EDM™ may also be used as the data analytics engine 204, which is capable of handling both high volume and real time data about operations and aggregate historical data used for engineering purposes. The Shared Asset Module provides the shared asset 214, which includes the system model. Each of the components jointly and separately benefit from the functionality provided by the shared asset 214.

The system architecture 200 integrates data entry/access by various stakeholders 218 over one or more servers and makes new data available for the system model, in real time, to all stakeholders 218 without the need for updated data requests from each stakeholder 218. The system architecture 200 insures that all stakeholders 218 are dynamically linked to current data-meaning that each database 202 is constantly accessible, in real time, to all stakeholders 218 without having to perform the traditional procedures to access a particular database. In other words, the system model is updated, in real time, each time new data enters the system model through a client, which is accessible by the stakeholders 218 through the dynamic link.

Referring now to FIGS. 6A-6F, various optional networking environments are illustrated in accordance with multiple embodiments of the invention. The computers illustrated in FIGS. 6A-6F may include desktop computers, laptop computers, dedicated servers, supercomputers, personal digital assistants (PDA's), other well known computing devices, or any combination thereof.

Figure 6A:
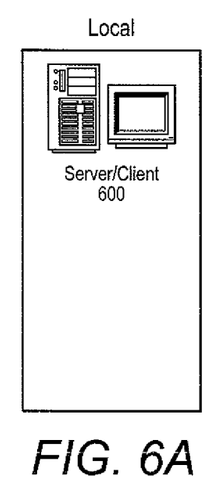
FIGS. 6A-6F illustrate enabling networking environments for implementing the present invention.

FIG. 6A illustrates a local environment. The local environment may include locally running a server/client 600. The server/client 600 may process data according to the methods described herein.

Figure 6B:
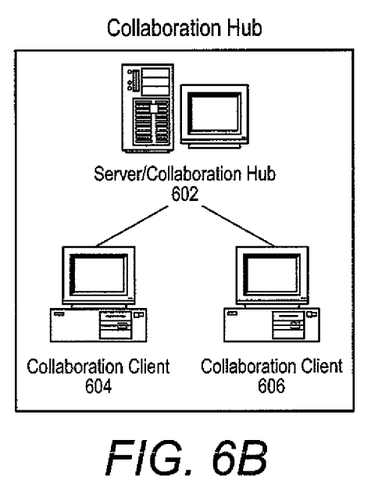

FIG. 6B illustrates a collaboration hub networking environment. A collaboration hub may include any computer that transmits data to and receives data from multiple other computers. A collaboration hub may also be configured to incorporate changes received from multiple other computers into a single data object or other data instance. A collaboration hub may also control application security settings for one or more other computers. The collaboration hub networking environment may include a server/collaboration hub 602, which may process data according to the methods described herein, as well as functioning as a collaboration hub. The collaboration hub networking environment may also include one or more collaboration clients 604, 606 that remotely access data, which is processed on the server/collaboration hub 602. In one embodiment, the collaboration clients 604, 606 may also alter or manipulate the processed data. These changes may be tracked, processed, or stored by the server/collaboration hub 602.

Figure 6C:
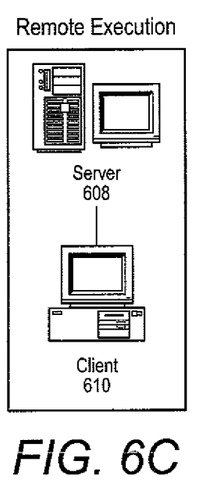

FIG. 6C illustrates a remote execution networking environment. The remote execution networking environment may include a server 608, which processes data according to the methods described herein. The remote execution networking environment may also include one or more clients 610 that remotely access data processed on the server 608.

Figure 6D:
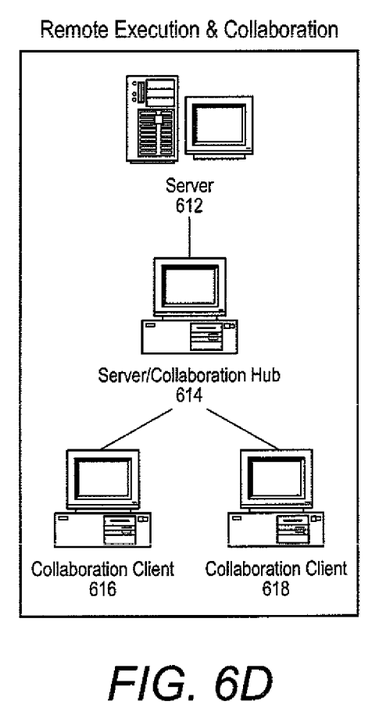

FIG. 6D illustrates a remote execution and collaboration networking environment. The remote execution and collaboration networking environment may include a server 612, which visibly or invisibly processes data according to the methods described herein. The remote execution and collaboration networking environment may also include one or more client/collaboration hubs 614. Each client/collaboration hub 614 may remotely access data that is processed on the server 612. Each client/collaboration hub 614 may transmit data to, and receive data from, one or more collaboration clients 616, 618. Each client/collaboration hub 614 may also be configured to incorporate changes received from collaboration clients 616, 618 into a single data object or other data instance. The client/collaboration hub 614 may also control security settings for collaboration clients 616, 618. The collaboration clients 616, 618 may remotely access data that is processed on the server 612 and transmitted via the client/collaboration hub 614. In one embodiment, the collaboration clients 616, 618 may also alter or manipulate the processed data. These changes may be tracked, processed, or stored by each client/collaboration hub 614 through window and display state changes that are sent to the server 612 for processing and synchronization of all client interactions.

Figure 6E:
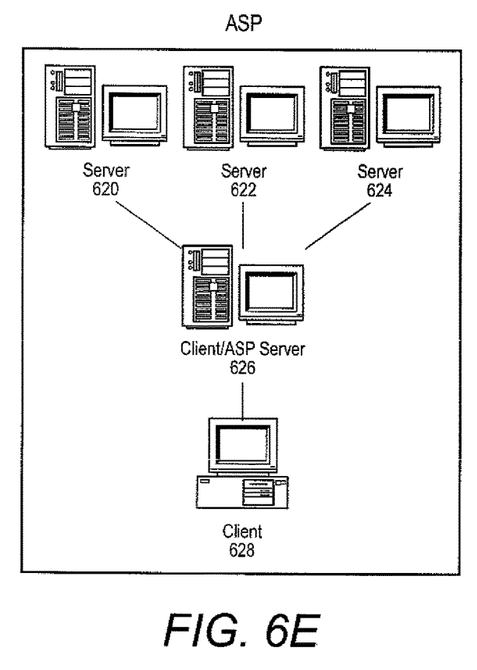

FIG. 6E illustrates an application service provider (ASP) networking environment. The ASP networking environment may include one or more servers 620, 622, 624, which process data according to the methods described herein. The ASP networking environment may also include one or more client/ASP servers 626. Each client/ASP server 626 may receive data that is processed on the servers 620, 622, 624. Each client/ASP server 626 may include a computer that is configured to manage and distribute software-based services and solutions to customers across a wide area or other network from a central data center. In one embodiment, each client/ASP server 626 may be a third-party server that is owned or operated by an entity separate from the entity owning and operating the servers 620, 622, 624 or the client 628. Each client/ASP server 626 may be an enterprise ASP, which is designed to deliver high-end business applications; a local or regional ASP, which is designed to supply a wide variety of application services for smaller businesses in a local area; a specialist ASP, which is designed to provide applications for a specific need; a vertical market ASP, which is designed to provide support to a specific industry;

or a volume business ASP, which is designed to supply small or medium-sized businesses with prepackaged application services in volume. The ASP networking environment may also include one or more clients 628 that remotely access data processed on the servers 620, 622, 624 and transmit the data to each client 628 via the client/ASP server 626.

Figure 6F:
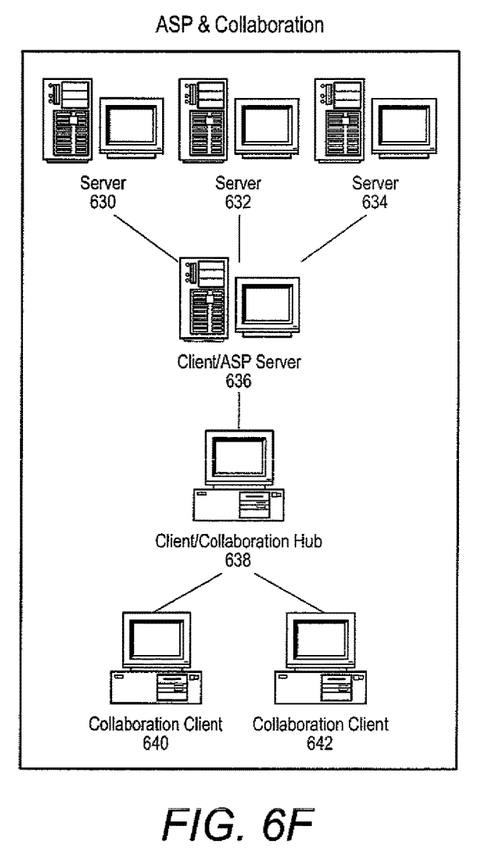

FIG. 6F illustrates an ASP and collaboration networking environment. The ASP and collaboration networking environment may include one or more servers 630, 632, 634, which process data according to the methods described herein. The ASP and collaboration networking environment may also include one or more client/ASP servers 636. Each client/ASP server 636 may receive data that is processed on the servers 630, 632, 634. Each client/ASP server 636 may include a computer that is configured to manage and distribute software-based services and solutions to customers across a wide area or other network from a central data center. In one embodiment, each client/ASP server 636 may include a third-party server that is owned or operated by an entity separate from the entity owning and operating the servers 630, 632, 634, the client/collaboration hub 638, or the client 640, 642. Each client/ASP server 636 may be an enterprise ASP, which is designed to deliver high-end business applications; a local or regional ASP, which is designed to supply a wide variety of application services for smaller businesses in a local area; a specialist ASP, which is designed to provide applications for a specific need; a vertical market ASP, which is designed to provide support to a specific industry; or a volume business ASP, which is designed to supply small or medium-sized businesses with prepackaged application services in volume.

The ASP and collaboration networking environment may also include one or more client/collaboration hubs 638. Each client/collaboration hub 638 may remotely access data that is processed on the servers 630, 632, 634 and is transmitted via the client/ASP server 636. Each client/collaboration hub 638 may transmit data to and receive data from multiple clients 640, 642. The client/collaboration hub 638 may be configured to incorporate changes received from clients 640, 642 into a single data object or other data instance. Each client/collaboration hub 638 may also control security settings for the clients 640, 642. The clients 640, 642 may also remotely access data that is processed on the servers 630, 632, 634, and transmitted via the client/ASP server 636 and the client/collaboration hub 638. In another embodiment, the collaboration clients 640, 642 may also alter or manipulate the rendered data through window and display state changes that are sent to the servers 630, 632, 634 for processing and synchronization of all client interactions.

Method Description

Figure 3A:
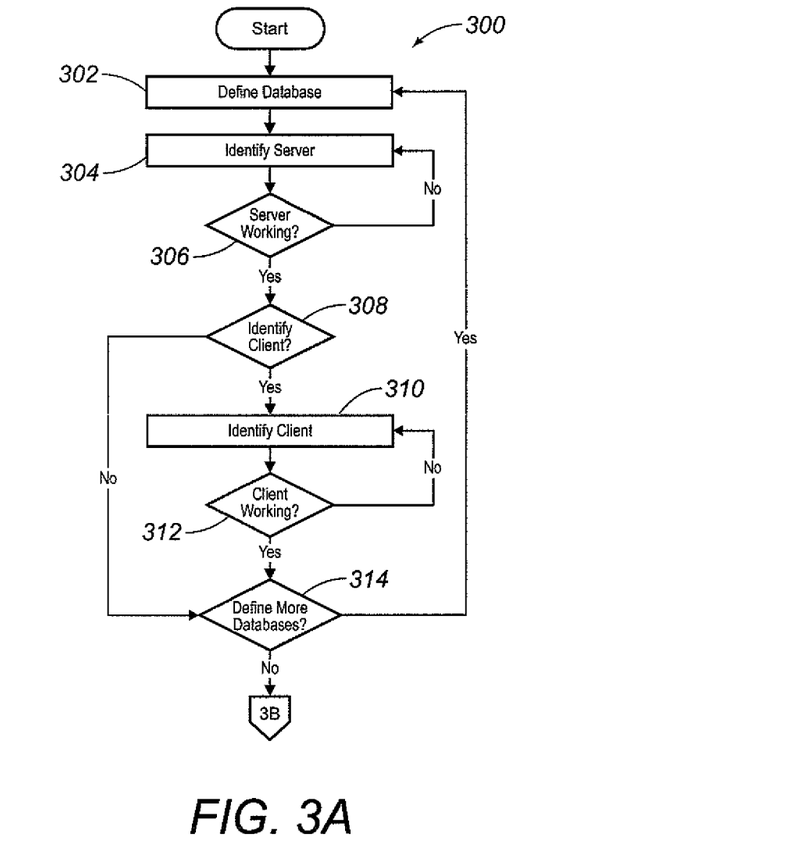
FIG. 3A is a flow diagram illustrating one embodiment of a method for implementing the present invention.

Referring now to FIG. 3A, a flow diagram illustrates one embodiment of a method 300 for implementing the present invention.

In step 302, a database is defined using a GUI or other means well known in the art. A database, for example, may be defined for interpretation data, planning data or drilling data relating to particular wells in an oil/gas field. Other databases may be defined for the same or different data relating to other wells in the same oil/gas field or other oil/gas fields. A database may be defined by creating it and populating it with input data, or a database may be defined by identifying a preexisting database. A preexisting database therefore, may be proprietary or owned by a third party.

In step 304, a server is identified using a GUI or other means well known in the art. The server may be identified by its URL and password.

In step 306, the method 300 determines whether the server identified in step 304 is working. If the server is working, then the method 300 continues to step 308. If the server is not working, then the method 300 returns to step 304.

In step 308, the method 300 determines whether to identify a client by using a GUI or other means well known in the art to prompt for this request. If a client needs to be identified, then the method 300 continues to step 310. If a client does not need to be identified, then the method 300 continues to step 314.

In step 310, a client is identified using a GUI or other means well known in the art. The client may be identified by its URL and password.

In step 312, the method 300 determines if the client identified in step 310 is working. If the client is working, then the method 300 continues to step 314. If the client is not working, then the method 300 returns to step 310.

In step 314, the method 300 determines if more databases need to be defined by using a GUI or other means well known in the art to prompt for this request. If more databases need to be defined, then the method 300 returns to step 302. If more databases do not need to be defined, then the method 300 continues to step 316.

In step 316, a data-integration platform is populated with each server and/or client identified in steps 304 and 310, respectively, and the location of each database defined in step 302 for a respective server and/or client. If only a server is identified, then the data-integration platform is limited to only reading from the database(s) defined in step 302. If, however, a server and a client are identified, then the data-integration platform is capable of reading and writing from/to the database(s) defined in step 302.

In step 318, a data type (object class) is selected from the database(s) that were populated in step 316 using a GUI or other means well known in the art. An object class, for example, may include wells for a particular production field.

In step 320, a name is created to identify the object class selected in step 318 using a GUI or other means well known in the art. The name, for example, may be "Field 1 Wells."

In step 322, an object is selected from the object class and is linked to the name created in step 320 using a GUI or other means well known in the art. Thus, for example, the object class name may be "Field 1 Wells" and the object selected from this class may be a particular well. The well is therefore, linked to the name Field 1 Wells.

Figure 3B:
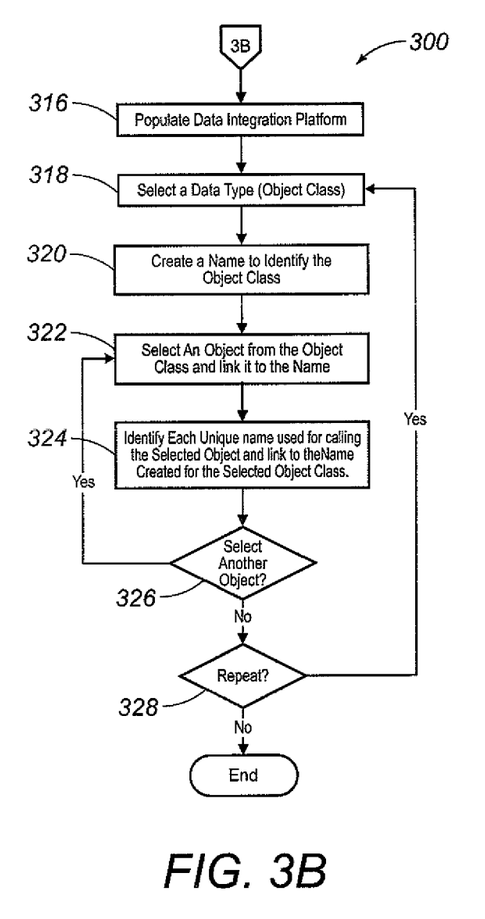
FIG. 3B is a flow diagram illustrating the continuation of the method in FIG. 3A.

In step 324, each unique name used by different respective stakeholders for calling the selected object is identified and linked to the name created for the object class in step 320. Each unique name for calling the selected object may be identified by comparing data profiles or data attributes for the selected object and one or more related objects, each controlled by a respective stakeholder, to determine whether the data profile or the data attribute for the selected object and the data profile or the data attribute for the one or more related objects substantially identify the same object. If each unique name substantially identifies the same object, then each unique name may be identified as being used for calling the selected object. The results of this step are stored in the data-integration platform, as a cross-reference table, which includes each server and/or client identified in steps 304 and 310, respectively. The data-integration platform therefore, may access interpretation data for wellbores (object class) associated with a particular well, which include interpretation data in the form of well logs, trajectories and reports (objects) for each wellbore. In the same manner, the data-integration platform may access interpretation data for wells (object class) associated with a particular oil/gas field, which may include wells and wellbores, surfaces and faults around each well (objects).

In step 326, the method 300 determines whether to select another object by using a GUI or other means well known in the art to prompt for this request. If another object needs to be selected from the object class, then the method 300 returns to step 322. If another object from the object class does not need to be selected, then the method 300 continues to step 328.

In step 328, the method 300 determines whether to repeat. If the method 300 is repeated, then the method 300 returns to step 318. The method 300 may be repeated for the same, or different, object classes and the same, or different, objects. If the method 300 does not repeat, then the method 300 ends.

Steps 322-328 may be performed automatically for each object in each object class in a computer implemented method 300 until all objects have been selected (exhausted) for each object class. Alternatively, steps 322-328 may be selectively performed for each object and each object class using a GUI or other means well known in the art.

The method 300 therefore, permits all objects (e.g. wells) from a named object class (e.g. Field 1 Wells) to be called (accessed) through a common system name, regardless of what unique name each stakeholder uses to identify a particular object. This process, for example, creates a cross-reference table in the data-integration platform comprising one or more objects, which permits a stakeholder to modify data related to an object identified by a unique name and another stakeholder to call the modified data related to the object using another unique name. If, for example, a stakeholder refers to a Well XYZ and another stakeholder refers to the same well as Well ABC, then the method 300 calls that well by a common system name created to identify the object class in step 320. Thus, when a stakeholder modifies, or adds to, the data for Well XYZ, another stakeholder may call that data by accessing (calling) Well ABC. In other words, when a stakeholder describes an object with a unique name and another stakeholder describes the same object with another unique name, the method 300 permits the object to be identified to either stakeholder using each stakeholder's respective unique name. Each stakeholder therefore, may access all objects within an object class, and modified data related thereto, using a respective unique name.

Figure 4:
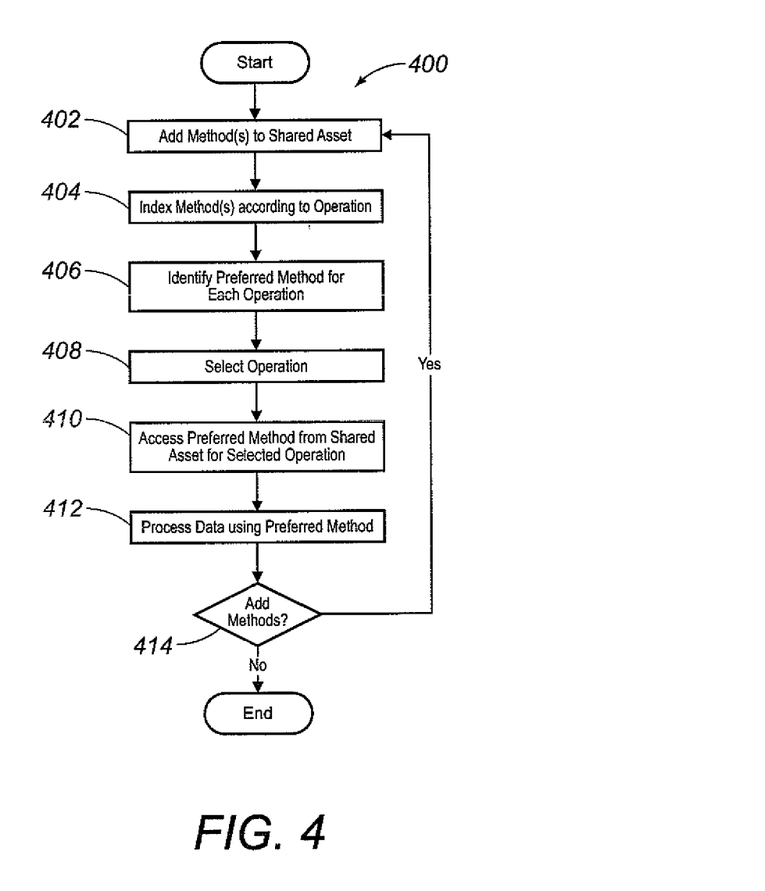
FIG. 4 is a flow diagram illustrating another embodiment of a method for implementing the present invention.

Referring now to FIG. 4, a flow diagram illustrates another embodiment of a method for implementing the present invention.

In step 402, a method is added to a shared asset using a GUI or other means well known in the art. The method may include, for example, subroutines that contain calculations or re-usable procedures. The shared asset, which includes the methods, also may include data related to the shared asset.

In step 404, the methods added to the shared asset in step 402 are indexed by the shared asset according to operation. For example, interpretation calculations may be indexed to separate them from drilling calculations. In addition, various interpretation calculations may be indexed according to specific constraints. In other words, the methods may be indexed (organized) according to their intended use (operation) and their constraints.

In step 406, a preferred method is identified for each operation using the index (intended use and constraints) for each method. Optionally, additional predetermined criteria may be used to identify a preferred method.

In step 408, an operation is selected using a GUI or other means well known in the art.

In step 410, the preferred method for the operation selected in step 408 is accessed from the shared asset. Applications may be built (or modified if they already exist) so that they can access a preferred method from the shared asset for a selected operation.

In step 412, data is processed using the preferred method for the selected operation. Applications have the ability to execute the preferred method from the shared asset, which means that the calculations may be done on a computer controlled by the shared asset. Alternatively, applications may request a dynamically-bound instance of the preferred method physically compiled within the application for processing the data using the preferred method.

In step 414, the method 400 determines whether to add a method by using a GUI or other means well known in the art to prompt for this request. If the method 400 determines that another method needs to be added, then the method 400 returns to step 402. If the method 400 determines that another method does not need to be added, then the method 400 ends. As alternative methods are developed, they may be added to the shared asset in the manner thus described.

The method 400 therefore, provides an index of preferred methods for selected operations, which may be accessed through a collaborative environment from a shared asset (system model) to insure uniform operation results.

Figure 5:
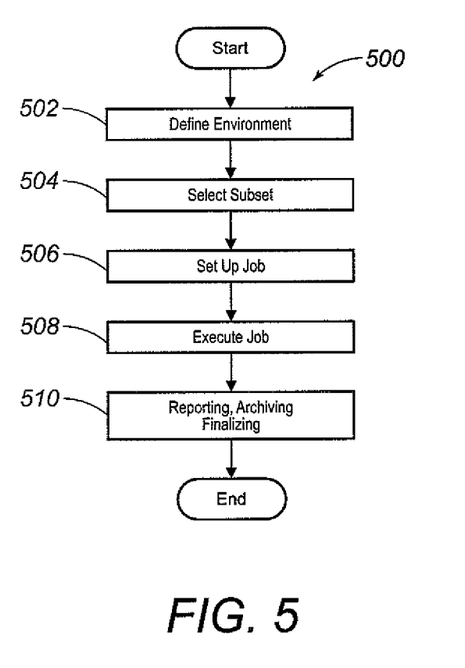
FIG. 5 is a flow diagram illustrating a standard workflow incorporating the present invention.

Referring now to FIG. 5, a flow diagram illustrates a standard workflow 500 incorporating the present invention.

In step 502, an environment is defined, which may include the type of data and methods disclosed herein and described in the '542 Application.

In step 504, a subset is selected from the environment. This step simply selects a preferred subset of the data and/or methods defined for the environment in step 502 for processing. For example, preferred databases and data objects relevant to a particular geographical region may be selected as a subset of a larger geographical environment defined in step 502. This subset is declared the data for a job.

In step 506, a job is defined (set up) by identifying i) various phases such as, for example, interpretation, design, modeling, drilling, and updating; ii) the methods/algorithms to process each data subset; iii) a list of rules that will define the stakeholders that will work with each data subset; and iv) the order (or workflow) that will be followed in the integrated process.

In step 508, the job is executed for each phase defined in step 506. For example, a job may be executed in a particular order according to the phases defined in step 506. In addition, the methods described herein and the methods described in the '542 Application are performed. For example, the method described in reference to FIG. 4 and the methods described in the '542 Application may yield a different preferred method and controlling stakeholder, respectively, depending upon which phase is currently being executed or performed. In other words, a selected operation may have a preferred method during the interpretation phase, which is different than the preferred method for the same operation during the design phase. Likewise, data controlled by a particular stakeholder during the interpretation phase may be controlled by a different stakeholder during the design phase. Results of this step may include data being updated, changed or created. Because the workflow 500 utilizes an integrated platform, the data is broadcast according to the rules described in reference to FIG. 3B.

In step 510, the results of the job are reported, archived and finalized before the method 500 ends.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A computer-implemented method for managing data in a collaborative environment, the computer-implemented method comprising:
   creating, by a processing unit, an object-class name that identifies an object class within the collaborative environment, the object class being a group of objects that are related to a particular well system;
   selecting, by the processing unit, an object from the object class, the object having information that is associated with the particular well system;
   linking, by the processing unit and within the collaborative environment, the object to the object-class name;
   identifying, by the processing unit, a plurality of unique names used by a plurality of stakeholders to identify the object in the collaborative environment; and
   linking, by the processing unit and within the collaborative environment, each unique name of the plurality of unique names to the object-class name to form an association between (i) the plurality of unique names, (ii) the object-class name, and (iii) the object, wherein the association enables the object to be called using any of the unique names in the plurality of unique names.

2. The computer-implemented method of claim 1, wherein the object is selected from the object class in a database, the object comprising data related to the object.

3. The computer-implemented method of claim 2, further comprising:
   identifying a server and a client, the server or the client comprising the database; and
   providing an identification of the server and the client accessing the database.

4. The computer-implemented method of claim 1, further comprising:
   calling the object by a first unique name of the plurality of unique names and a second unique name of the plurality of unique names.

5. The computer-implemented method of claim 1, wherein identifying the plurality of unique names for the object comprises:
   comparing a first data profile for the object to a second data profile a related object to determine whether the first data profile and the second data profile substantially identify a same object.

6. The computer-implemented method of claim 1, further comprising:
   modifying the object to create a modified object; and
   calling the modified object by at least two different unique names of the plurality of unique names.

7. The computer-implemented method of claim 1, further comprising, for each respective object in the object class:
   selecting the respective object;
   linking the respective object to the object-class name in the collaborative environment;
   identifying a respective plurality of unique names used by a respective plurality of stakeholders to identify the respective object in the collaborative environment; and
   linking, within the collaborative environment, each unique name in the respective plurality of unique names to the object-class name to form a respective association between (i) the respective plurality of unique names, (ii) the object-class name, and (iii) the respective object, wherein the respective association enables the respective object to be called using any of the unique names in the respective plurality of unique names.

8. The computer-implemented method of claim 1, further comprising repeating the steps of claim 1 for multiple different object classes.

9. A non-transitory computer readable medium comprising program code that is executable by a processing unit for causing the processing unit to:
   create an object-class name that identifies an object class within a collaborative environment, the object class being a group of objects that are related to a particular well system;
   select an object from the object class, the object having information that is associated with the particular well system;
   link, within the collaborative environment, the object to the object-class name;
   identify a plurality of unique names used by a plurality of stakeholders to identify the object in the collaborative environment; and
   link, within the collaborative environment, each unique name of the plurality of unique names to the object-class name to form an association (i) the plurality of unique names, (ii) the object-class name, and (iii) the object, wherein the association enables the object to be called using any of the unique names in the plurality of unique names.

10. The non-transitory computer readable medium of claim 9, wherein the object is selected from the object class in a database, the object comprising data related to the object.

11. The non-transitory computer readable medium of claim 10, further comprising program code that is executable by the processing unit for causing the processing unit to:
   Identify a server and a client, the server or the client comprising the database; and
   provide an identification of the server and the client to the collaborative environment for enabling the collaborative environment to access the database.

12. The non-transitory computer readable medium of claim 9, further comprising program code that is executable by the processing unit for causing the processing unit to:
   call the object by a first unique name of the plurality of unique names and a second unique name of the plurality of unique names.

13. The non-transitory computer readable medium of claim 9, wherein identifying the plurality of unique names for the object comprises:
   comparing a first data profile for the object to a second data profile a related object to determine whether the first data profile and the second data profile substantially identify a same object.

14. The non-transitory computer readable medium of claim 13, further comprising program code that is executable by the processing unit for causing the processing unit to:
   modify the object to create a modified object; and
   call the modified object by at least two different unique names of the plurality of unique names.

15. The non-transitory computer readable medium of claim 9, further comprising program code that is executable by the processing unit for causing the processing unit to, for each respective object in the object class:
   select the respective object;
   link the respective object to the object-class name in the collaborative environment;
   identify a respective plurality of unique names used by a respective plurality of stakeholders to identify the respective object in the collaborative environment; and
   link, within the collaborative environment, each unique name in the respective plurality of unique names to the object-class name to form a respective association between (i) the respective plurality of unique names, (ii) the object-class name, and (iii) the respective object, wherein the respective association enables the respective object to be called using any of the unique names in the respective plurality of unique names.

16. The non-transitory computer readable medium of claim 9, further comprising program code that is executable by the processing unit for causing the processing unit to repeat the steps of claim 11 for multiple different object classes.

17. A system comprising:
   a processing unit; and
   a memory on which instructions executable by the processing unit are stored for causing the processing unit to:
      create an object-class name that identifies an object class within a collaborative environment, the object class being a group of objects that are related to a particular well system;
      select an object from the object class, the object having information that is associated with the particular well system;
      link, within the collaborative environment, the object to the object-class name;
      identify a plurality of unique names used by a plurality of stakeholders to identify the object in the collaborative environment; and
      link, within the collaborative environment, each unique name of the plurality of unique names to the object-class name to form an association between (i) the plurality of unique names, (ii) the object-class name, and (iii) the object, wherein the association enables the object to be called using any of the unique names in the plurality of unique names.

18. The system of claim 17, wherein the memory further comprises instructions executable by the processing unit for causing the processing unit to identify the plurality of unique names for the object by:
   comparing a first data profile for the object to a second data profile for a related object to determine whether the first data profile and the second data profile substantially identify a same object.

19. The system of claim 17, wherein the memory further comprises instructions executable by the processing unit for causing the processing unit to:
   modify the object to create a modified object; and
   call the modified object by at least two different unique names of the plurality of unique names.

20. The system of claim 17, wherein the memory further comprises instructions executable by the processing unit for causing the processing unit to, for each respective object in the object class:
   select the respective object;
   link the respective object to the object-class in the collaborative environment;
   identify a respective plurality of unique names used by a respective plurality of stakeholders to identify the respective object in the collaborative environment; and
   link, within the collaborative environment, each unique name in the respective plurality of unique names to the object-class name to form a respective association between (i) the respective plurality of unique names, (ii) the object-class name, and (iii) the respective object, wherein the respective association enables the respective object to be called using any of the unique names in the respective plurality of unique names.

* * * * *